US009266465B2

(12) United States Patent
Shibata et al.

(10) Patent No.: US 9,266,465 B2
(45) Date of Patent: Feb. 23, 2016

(54) VEHICULAR HEADLAMP AND REPLACEMENT METHOD FOR LEVELING ACTUATOR OF THE VEHICULAR HEADLAMP

(71) Applicants: Hiroki Shibata, Shizuoka (JP); Kazutami Oishi, Shizuoka (JP)

(72) Inventors: Hiroki Shibata, Shizuoka (JP); Kazutami Oishi, Shizuoka (JP)

(73) Assignee: KIOTO MANUFACTURING CO., LTD., Tokyo (JP)

( * ) Notice: Subject to any disclaimer, the term of this patent is extended or adjusted under 35 U.S.C. 154(b) by 651 days.

(21) Appl. No.: 13/672,939

(22) Filed: Nov. 9, 2012

(65) Prior Publication Data

US 2013/0121013 A1 May 16, 2013

(30) Foreign Application Priority Data

Nov. 11, 2011 (JP) .................................. 2011-247796

(51) Int. Cl.
| | |
|---|---|
| *F21V 19/02* | (2006.01) |
| *F21V 21/14* | (2006.01) |
| *B23P 6/00* | (2006.01) |
| *B23P 19/04* | (2006.01) |
| *B23P 23/00* | (2006.01) |
| *B60Q 1/00* | (2006.01) |
| *B60Q 1/068* | (2006.01) |
| *B60Q 1/076* | (2006.01) |

(52) U.S. Cl.
CPC ............ *B60Q 1/0064* (2013.01); *B60Q 1/0683* (2013.01); *B60Q 1/076* (2013.01); *B60Q 2900/20* (2013.01); *Y02T 10/88* (2013.01); *Y10T 29/4973* (2015.01)

(58) Field of Classification Search
CPC .... B60Q 1/0683; B60Q 1/068; B60Q 1/0064; B60Q 1/007; B60Q 1/0686; B60Q 1/045; B60Q 2900/20; B60Q 2900/10; Y10T 29/4973; Y10T 29/49726; Y10T 29/49728
USPC ....................................... 362/523; 29/402.08
See application file for complete search history.

(56) References Cited

U.S. PATENT DOCUMENTS

| | | | |
|---|---|---|---|
| 2003/0117812 A1* | 6/2003 | Serizawa ....................... | 362/528 |
| 2008/0089086 A1* | 4/2008 | Tajima et al. .................. | 362/524 |
| 2008/0130301 A1* | 6/2008 | Kusagaya ...................... | 362/466 |
| 2008/0225543 A1* | 9/2008 | Kuwahara et al. ............. | 362/523 |
| 2013/0051059 A1* | 2/2013 | Abai et al. ..................... | 362/523 |

FOREIGN PATENT DOCUMENTS

JP          2004-227933 A      8/2004

\* cited by examiner

*Primary Examiner* — Jong-Suk (James) Lee
*Assistant Examiner* — William N Harris
(74) *Attorney, Agent, or Firm* — Sughrue Mion, PLLC

(57) ABSTRACT

A vehicular headlamp includes: a bracket having an actuator attaching portion that has a first fixation portion and a second fixation portion and part of which is a cuttable portion; a first actuator that is attached to the actuator attaching portion from one direction and is fixed via the first fixation portion; and a lamp unit that is supported by the bracket and that is capable of being tilted relative to the bracket by drive force of the first actuator. The actuator attaching portion is configured so that the cuttable portion can be cut off to detach the first actuator from the bracket in another direction than the one direction and a second actuator can be attached to the actuator attaching portion from the another direction and fixed to the actuator attaching portion via the second fixture portion.

15 Claims, 10 Drawing Sheets

VEHICULAR HEADLAMP AND REPLACEMENT METHOD FOR LEVELING ACTUATOR OF THE VEHICULAR HEADLAMP

INCORPORATION BY REFERENCE

The disclosure of Japanese Patent Application No. 2011-247796 filed on Nov. 11, 2011 including the specification, drawings and abstract is incorporated herein by reference in its entirety.

BACKGROUND OF THE INVENTION

1. Field of the Invention

The present invention relates to a vehicular headlamp and a replacement method for a leveling actuator of the vehicular head lamp.

2. Description of Related Art

In a vehicular headlamp, a lamp unit that has a light source is disposed within an outer lamp casing including a cover and a lamp housing.

The lamp unit of a vehicular headlamp is sometimes provided with capability of both aiming adjustment that is initial adjustment of the light radiation direction by a light axis adjustment mechanism and leveling adjustment in which the inclination of the radiation direction depending on the weight of the load on the vehicle (e.g., Japanese Patent Application Publication No. 2004-227933 (JP 2004-227933 A)).

In the vehicular headlamp described in JP 2004-227933 A, the lamp unit is supported by a frame-shaped bracket that has a through hole that extends in the longitudinal direction, and the bracket is supported by the lamp housing via two adjustment shafts that each have a threaded shaft portion (screw portion) and one fulcrum shaft (drive shaft). Rear end portions of the fulcrum shaft and the two adjustment shafts are linked to the lamp housing, and a front end portion of the fulcrum shaft is linked to a lower end portion of the bracket. Front end portions of the two adjustment shafts are linked to an upper end portion of the bracket so as to be apart from each other in the lateral direction.

Furthermore, the fulcrum shaft is a drive shaft provided for a leveling actuator, and projects forward from a drive control portion of the leveling actuator. The drive control portion of the leveling actuator is attached to an external surface of the lamp housing.

In the vehicular headlamp, when one or both of the adjustment shafts are rotated so that the threaded shaft portion of the one or two adjustment shafts is screwed in or back out, the bracket and the lamp unit are tilted integrally as one unit in a horizontal plane or a vertical plane, with the fulcrum shaft serving as a fulcrum. Thus, lateral aiming adjustment or vertical aiming adjustment is performed.

On the other hand, when the drive shaft (fulcrum shaft) is moved in the longitudinal direction by drive force of the drive control portion of the leveling actuator, the bracket and the lamp unit are tilted integrally together in the vertical plane, with the two adjustment shafts serving as fulcrums. In this manner, leveling adjustment is performed.

As described above, in the vehicular headlamp described in JP 2004-227933 A, since the drive control portion of the leveling actuator is attached to the external surface of the lamp housing, the drive control portion is projected rearward from the lamp housing. Therefore, due to the projection of the drive control potion, a considerable space is needed in order to dispose the drive control portion, and impedes size reduction of the vehicular headlamp.

Therefore, among vehicular headlamps in which the lamp unit is disposed within the outer lamp casing as described above, there exists a vehicular headlamp whose size reduction is made possible by attaching the leveling actuator to the bracket and disposing the leveling actuator within the outer lamp casing.

In the vehicular headlamp, if the leveling actuator is broken, for example, it becomes necessary to perform a replacement operation of detaching the leveling actuator from the bracket and attaching a new leveling actuator to the bracket.

In such a case, however, in a construction in which the leveling actuator is disposed within the outer lamp casing as described above, the aforementioned replacement operation needs to be performed both inside and outside the outer lamp casing, which may reduce the ease of maintenance.

SUMMARY OF THE INVENTION

The present invention provides a vehicular headlamp that is reduced in size and improved in the ease of maintenance, and also provides a replacement method for a leveling actuator of the vehicular headlamp.

A vehicular headlamp in accordance with a first aspect of the present invention includes: an outer lamp casing that includes a lamp housing and a cover, the lamp housing having an opening, the cover closing the opening of the lamp housing; a bracket including an actuator attaching portion that has a first fixation portion and a second fixation portion and part of which is a cuttable portion, the bracket being supported, within the outer lamp casing, by the lamp housing so as to be tiltable in a predetermined direction via an aiming adjustment mechanism; a first leveling actuator that is attached, within the outer lamp casing, to the actuator attaching portion from one direction and is fixed via the first fixation portion; and a lamp unit that is supported, within the outer lamp casing, by the bracket so as to be tiltable in a predetermined direction and to which the first leveling actuator is linked and that is capable of being tilted relative to the bracket by drive force of the first leveling actuator, wherein the actuator attaching portion is configured so that the cuttable portion can be cut off to detach the first leveling actuator from the bracket in another direction than the one direction and a second leveling actuator can be attached to the actuator attaching portion from the another direction and fixed to the actuator attaching portion via the second fixation portion.

Therefore, in the vehicular headlamp, the cuttable portion is cut off, and the leveling actuator is detached from the bracket.

A replacement method for a leveling actuator in accordance with a second aspect of the present invention includes: attaching a first leveling actuator, from one direction, to an actuator attaching portion that is provided, within an outer lamp casing, on a bracket supported so as to be tiltable in a predetermined direction and part of which is a cuttable portion, and fixing the first leveling actuator via a first fixation portion that is provided on the actuator attaching portion; cutting off the cuttable portion and detaching the first leveling actuator from the bracket in another direction than the one direction; and attaching a second leveling actuator to the actuator attaching portion from the another direction, and fixing the second leveling actuator via a second fixation portion that is provided on the actuator attaching portion.

Therefore, in the replacement method for a leveling actuator, the cuttable portion is cut off, and the leveling actuator is detached from the bracket.

According to the vehicular headlamp in accordance with the first aspect of the present invention, since the leveling actuator is attached to the bracket and the leveling actuator is disposed within the outer lamp casing, it is possible to improve the ease of maintenance regarding the leveling actuator while achieving a size reduction.

According to the replacement method for a leveling actuator of a vehicular headlamp in accordance with the second aspect of the present invention, since the leveling actuator is attached to the bracket and the leveling actuator is disposed within the outer lamp casing, it is possible to improve the ease of maintenance regarding the leveling actuator while achieving a size reduction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a vehicular headlamp including a leveling actuator and a replacement method for the leveling actuator, each of which is in accordance with an embodiment of the present invention, will be described with reference to the accompanying drawings. In the specification and the appended claims, the horizontal, up, down, vertical, left, right, lateral, front, rear, longitudinal directions mean the directions with respect to a vehicular headlamp mounted in a vehicle.

The vehicular headlamp 1 is attached to each of left and right end portions of a front end portion of a vehicle body.

Figure 1:
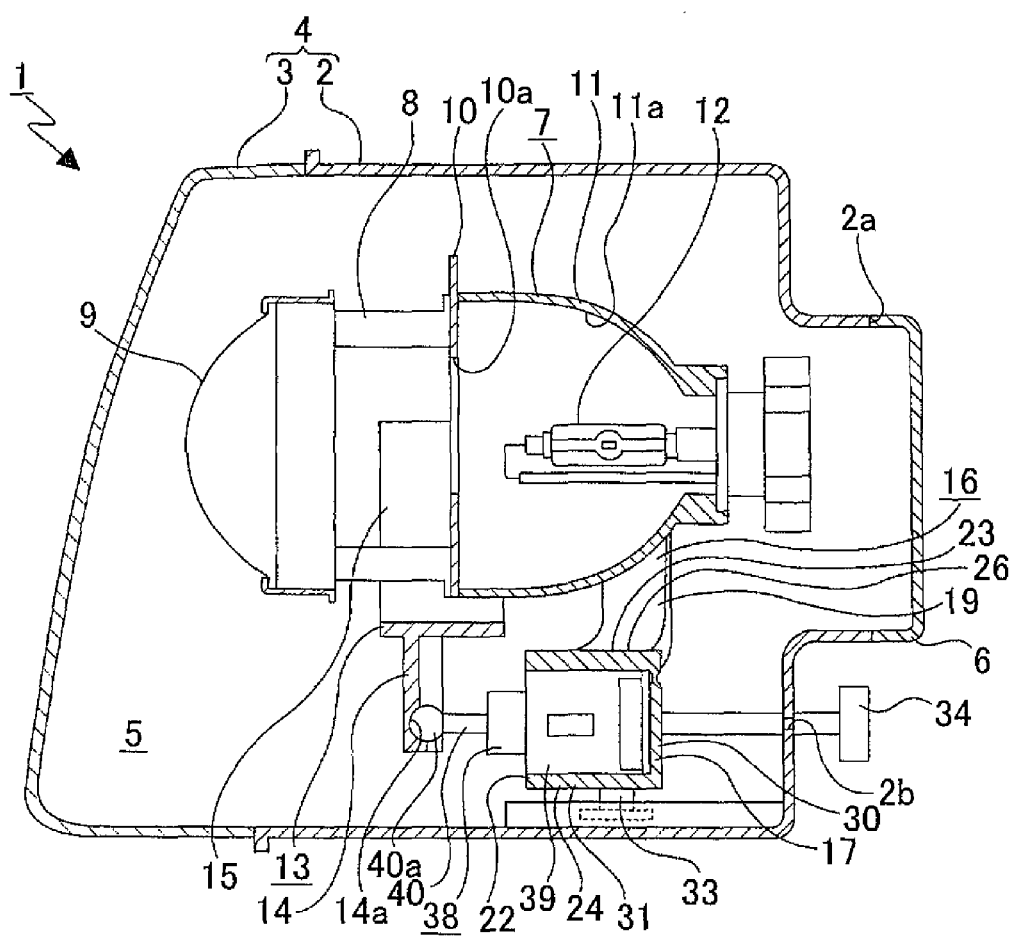
FIG. 1 is a schematic longitudinal section of a vehicular headlamp in accordance with an embodiment of the present invention.

The vehicular headlamp 1, as shown in FIG. 1, includes a lamp housing 2 that has a recess portion that is open forward, and a cover 3 that closes an opening of the lamp housing 2. The lamp housing 2 and the cover 3 constitute an outer lamp casing 4. An internal space of the outer lamp casing 4 is formed as a lamp chamber 5.

A rear end portion of the lamp housing 2 is provided with an attachment hole 2a that extends in the longitudinal direction. A back cover 6 is attached to the attachment hole 2a.

A rear end portion of the lamp housing 2 is provided with two shaft insertion holes 2b, 2b that extend in the longitudinal direction and that are apart from each other in the lateral direction.

Figure 2:
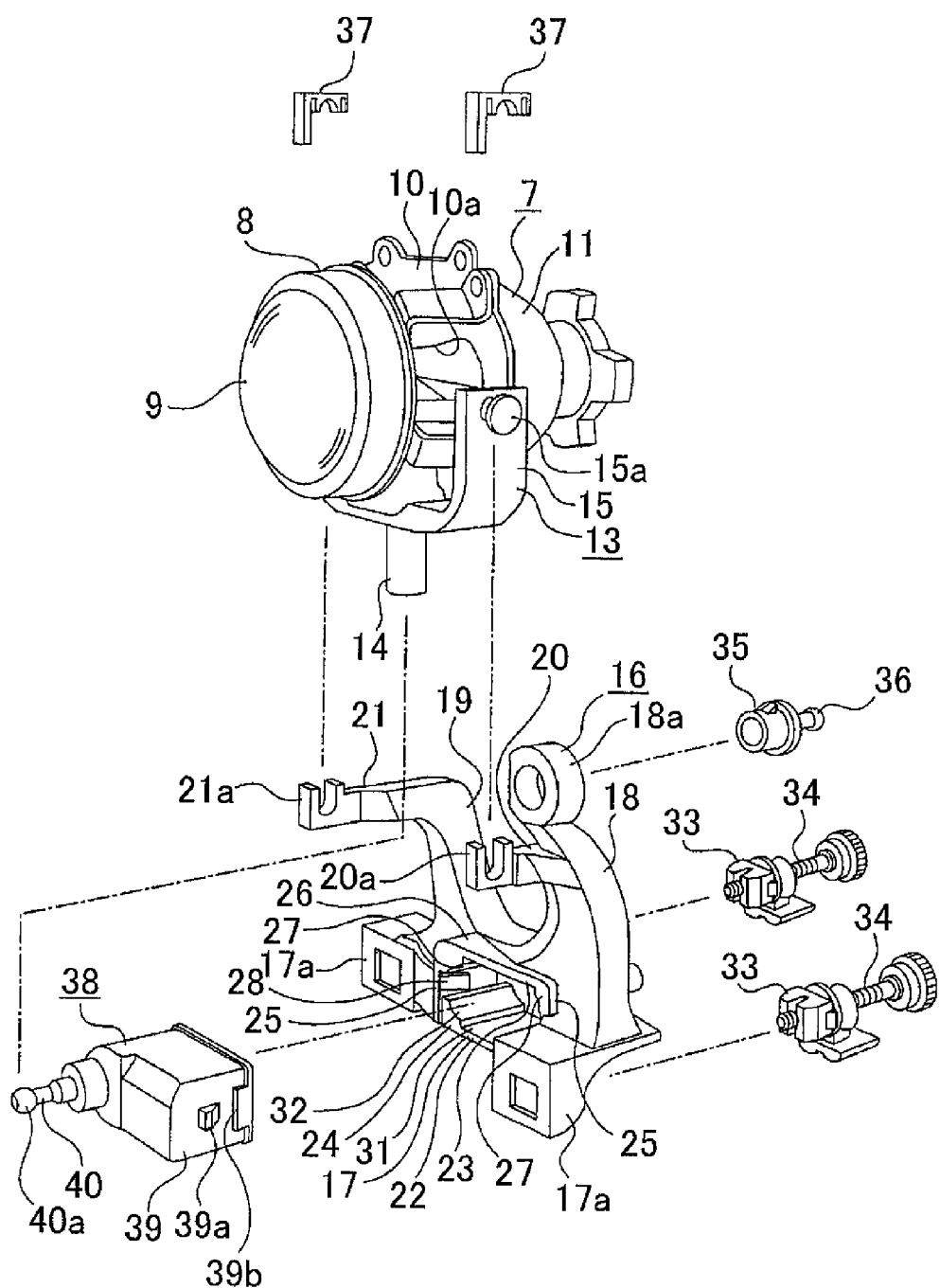
FIG. 2 is an exploded perspective view showing an internal construction of the vehicular headlamp shown in FIG. 1.

A lamp unit 7 is disposed in the lamp chamber 5 (see FIGS. 1 and 2). The lamp unit 7 has a lens holder 8, a projection lens 9 attached to a front end portion of the lens holder 8, a shade 10 to which a rear end portion of the lens holder 8 is attached, a reflector 11 whose front end portion is attached to the shade 10, and a light source 12 attached to a rear end portion of the reflector 11.

The shade 10 is formed in a plate shape that faces in the longitudinal direction, and has a light passage hole 10a that extends through the shade 10 in the longitudinal direction. The shade 10 blocks part of the light emitted from the light source 12, and the light that has been emitted from the light source 12 and has passed through the light passage hole 10a is radiated forward through the projection lens 9.

An internal surface of the reflector 11 is formed as a reflective surface 11a.

The light source 12 is, for example, a discharge bulb. Light emitted from the light source 12 travels forward or is reflected by the reflective surface 11a of the reflector 11 before the light is projected forward as illumination light through the projection lens 9.

The lamp unit 7 is retained on a joint 13. The joint 13 has a shaft linkage portion 14 that extends in the vertical direction, and an arm portion 15 formed in generally a U-shape that connects continuously to the upper end of the shaft linkage portion 14 and that is open upward.

The shaft linkage portion 14 is provided with a linking recess portion 14a that is open rearward.

Each of upper end portions of the arm portion 15 is provided with a pivoting shaft portion 15a that is a round shaft projected outward (sideway).

A bracket 16 formed of a resin material is disposed in the lamp chamber 5. The bracket 16 is supported on the lamp housing 2 so as to be tiltable by an aiming adjustment mechanism described later. The bracket 16 includes a laterally elongated base portion 17, a first arm portion 18 projected upward from a left end portion of the base portion 17, a second arm portion 19 projected upward from a portion of the base portion 17 that is on the side closer to a right end of the base portion 17 with respect to the center of the base portion 17 in the lateral direction, a first support protrusion 20 projected forward from a portion of the first arm portion 18 that is on the side closer to an upper end of the first arm portion 18 with respect to the center of the base portion 17 in the vertical direction, and a second support protrusion 21 projected forward from an upper end portion of the second arm portion 19.

Left and right end portions of the base portion 17 are provided as mechanism linkage portions 17a, 17a, respectively. A portion of the base portion 17 between the two mechanism linkage portions 17a, 17a is provided as an actuator attaching portion 22.

Figure 3:
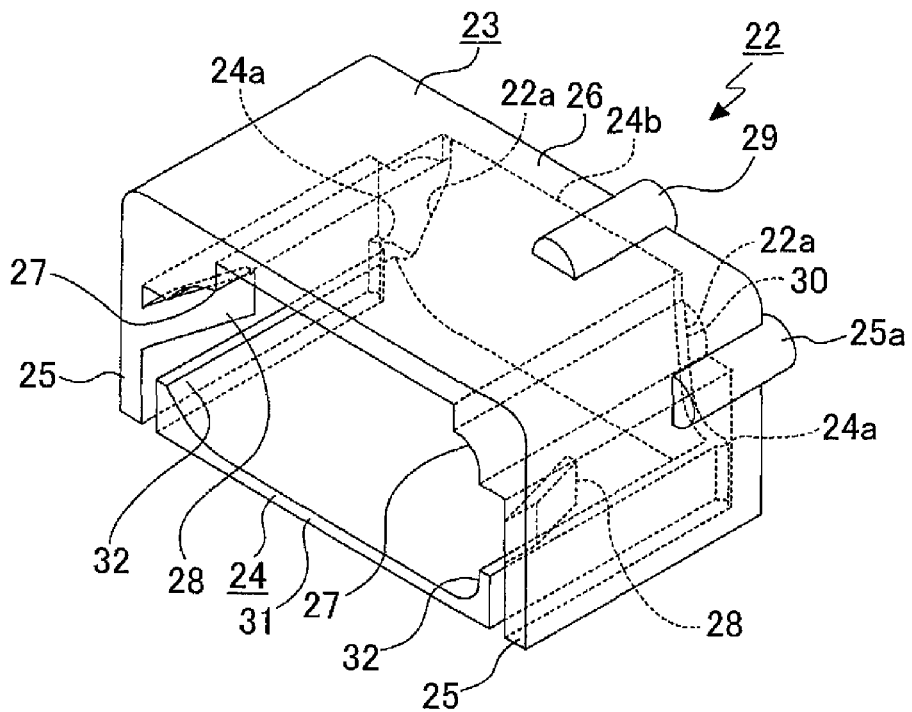
FIG. 3 is an enlarged perspective view of an actuator attaching portion.

The actuator attaching portion 22, in which an outer frame portion 23 and a cuttable portion 24 are formed integrally as one unit, is formed in the shape of a box that is open forward (see FIG. 3).

The outer frame portion 23 has generally plate-shaped side portions 25, 25 that face in the lateral direction and are apart from each other in the lateral direction, and a generally plate-shaped upper portion 26 that links upper end portions of the side portions 25, 25 and that faces in the vertical direction. An upper end portion of each of the side portions 25, 25 and lateral end portions of the upper portion 26 are connected by upper-side retention portions 27, 27.

An internal surface of each of the side portions 25, 25 is provided with a first fixation portion 28. The first fixation portions 28, 28 are elastically deformable and are formed in a rectangular plate shape. A front end portion of each first fixation portion 28 is continuous to a corresponding one of the side portions 25, 25 and is inclined so as to become apart from the corresponding side portion 25 with increase in distance rearward from the front end of the side portion 25.

Figure 4:
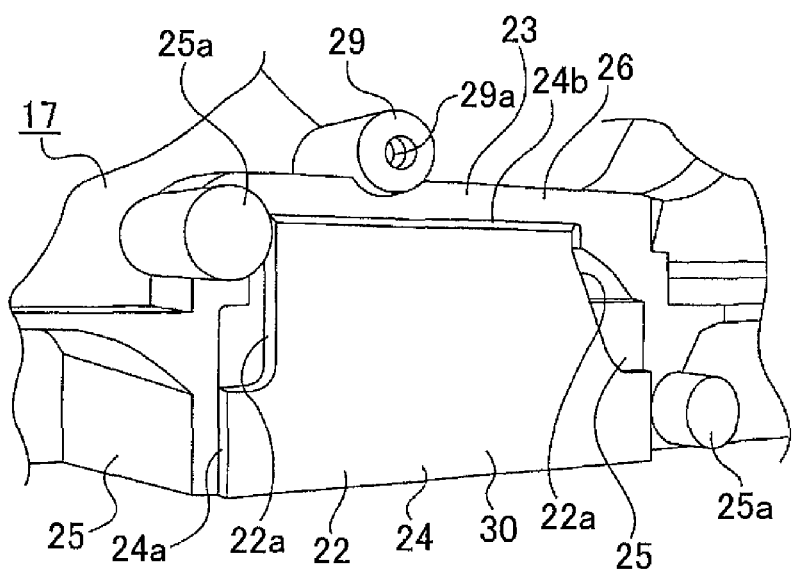
FIG. 4 is an enlarged perspective view showing the actuator attaching portion viewed from a direction different from the direction from which the actuator attaching portion is viewed in FIG. 3.

An outer surface side of each of the side portions 25, 25 is provided with a positioning boss 25a (see FIG. 4). One of the positioning bosses 25a, 25a is provided on an upper end portion of a corresponding one of the side portions 25, 25, and the other one of the positioning bosses 25a, 25a is provided on a lower end portion of the other side portion 25. Rear end portions of the positioning bosses 25a, 25a are projected rearward.

A second fixation portion 29 is provided on an upper surface of the upper portion 26. The second fixation portion 29 has a screw hole 29a that is open rearward.

The cuttable portion 24, as shown in FIG. 3 and FIG. 4, includes a back surface portion 30 that faces in the front-back direction, a bottom surface portion 31 projected forward from a lower end portion of the back surface portion 30, and lower-side retention portions 32, 32 provided at left and right end portions of the bottom surface portion 31. Each of the lower-side retention portions 32, 32 has a portion that is inclined relative to the vertical direction and to the horizontal direction.

In the cuttable portion 24, lower portions of the left and right side edges of the back surface portion 30 are provided as first junction portions 24a, 24a that are joined to the side portions 25, 25, respectively, and an upper edge of the back surface portion 30 is provided as a second junction portion 24b that is joined to the upper portion 26. The first junction portions 24a, 24a and the second junction portion 24b are each provided in a linear shape, and are formed in a thin-walled configuration whose thickness is less than the thicknesses of other portions of the bracket 16.

In the actuator attaching portion 22, a through, hole 22a is formed between each of the first junction portions 24a, 24a and the second junction portion 24b. A portion of a back surface portion 30-side opening edge of each of the through holes 22a, 22a is formed in a curved line shape. The first fixation portions 28, 28 are provided to the front of the through holes 22a, 22a, respectively.

Thus, the actuator attaching portion 22 is constructed so that the first fixation portions 28, 28 are provided to the front of the through holes 22a, 22a, respectively. In other words, the actuator attaching portion 22 has the through holes 22a, 22a in the back surface portion 30 that is adjacent to the side portions 25, 25 to which the first fixation portions 28, 28 is continuous. In addition, each of the through holes 22a, 22a extends at least throughout a region of a projection of the first fixation portion 28 on a plane that includes the back surface portion 30. Therefore, when the bracket 16 is manufactured by injection molding through the use of a molding die, the first fixation portions 28, 28 can easily be formed by setting the mold release direction of the molding die to the direction in which the through holes 22a, 22a extend (the longitudinal direction).

An upper end portion of the first arm portion 18 of the bracket 16 is provided as a mechanism linkage portion 18a (see FIG. 2). A front end portion of the first support protrusion 20 and a front end portion of the second support protrusion 21 are provided as shaft support portions 20a and 21a, respectively, each of which has a support groove that is open upward.

Manipulating shafts 34, 34 are linked to the mechanism linkage portions 17a, 17a of the base portion 17 via linkage members 33, 33, respectively. The manipulating shafts 34, 34 are inserted into the shaft insertion holes 2b, 2b formed in the lamp housing 2, and are supported by the lamp housing 2 so as to be rotatable about the axis but unmovable in the axis direction.

A pivot shaft 36 is linked to the mechanism linkage portion 18a of the first arm portion 18 via a bearing member 35. The pivot shaft 36 is linked to a rear end portion of the lamp housing 2.

The linkage members 33, 33, the manipulating shafts 34, 34, the bearing member 35 and the pivot shaft 36 described above function as an aiming adjustment mechanism.

The lamp unit 7 is supported on the bracket 16 via the joint 13 so as to be pivotable. The pivoting shaft portions 15a, 15a of the joint 13 of the lamp unit 7 are placed into the shaft support portion 20a of the first support protrusion 20 and the shaft support portion 21a of the second support protrusion 21, respectively, from above, so that the lamp unit 7 is rotatable relative to the bracket 16 with the pivoting shaft portions 15a, 15a of the joint 13 serving as fulcrums.

With the lamp unit 7 supported on the bracket 16 via the joint 13, coming-off preventing members 37, 37 are attached to the shaft support portions 20a and 21a from above.

A leveling actuator 38 is attached to the actuator attaching portion 22 of the bracket 16.

The leveling actuator 38 is made up of a drive control portion 39 and a driving shaft 40 that is projected forward from the drive control portion 39. The driving shaft 40 is moved in the longitudinal direction by drive force of the drive control portion 39.

Left and right side surfaces of the drive control portion 39 are provided with fixing protrusions 39a, 39a, each of which has an inclined surface that extends gradually outward with increase in the distance forward from a rear end of the inclined surface, and are also provided with engaging protrusions 39b, 39b that are projected outward and are spaced apart in the longitudinal direction. A front end portion of the driving shaft 40 is provided as a spherical linkage portion 40a.

The leveling actuator 38 is attached to the actuator attaching portion 22 by inserting the drive control portion 39 into the actuator attaching portion 22 from the front side. When the drive control portion 39 is inserted into the actuator attaching portion 22 from the front side, the inclined surfaces of the fixing protrusions 39a, 39a of the drive control portion 39 are slid along the first fixation portions 28, 28 so that the first fixation portions 28, 28 are elastically deformed, and as the front ends of the fixing protrusions 39a, 39a come to predetermined positions relative to the first fixation portions 28, 28, the first fixation portions 28, 28 become elastically restored to be caught on the front edges of the fixing protrusions 39a, 39a. Thus, the drive control portion 39 is fixed by the first fixation portions 28, 28.

Since the leveling actuator 38 is attached by inserting it into the actuator attaching portion 22 from the front side, the leveling actuator 38 can easily be attached to the actuator attaching portion 22.

Furthermore, since the leveling actuator 38 is fixed by the first fixation portions 28, 28 that elastically deform when the leveling actuator 38 is inserted into the actuator attaching portion 22, the assembly operation of attaching the leveling actuator 38 to the actuator attaching portion 22 can be simplified.

The driving shaft 40 is linked to the joint 13 by inserting the spherical linkage portion 40a of the driving shaft 40 into a linking recess portion 14a that is formed on the shaft linkage portion 14.

When the drive control portion 39 is fixed by the first fixation portions 28, 28, a rear surface and a lower surface of the drive control portion 39 are held from rear and from below by the back surface portion 30 and the bottom surface portion 31, respectively, of the cuttable portion 24, and four corner portions of the drive control portion 39 are respectively held from outside by the upper-side retention portions 27, 27 of the outer frame portion 23 and the lower-side retention portions 32, 32 of the cuttable portion 24.

Therefore, the leveling actuator 38 is stably retained by the actuator attaching portion 22 in a state where the leveling actuator 38 is positioned at a predetermined position relative to the actuator attaching portion 22.

In the above-described vehicular headlamp 1, if one of the manipulating shafts 34 is turned, the lamp unit 7 and the bracket 16 are tilted (pivoted) together, with the fulcrum being an axis connecting the pivot shaft 36 and the linkage member 33 to which the other manipulating shaft 34 is linked. In this manner, one of the vertical aiming adjustment and the lateral aiming adjustment that are initial adjustments of the optical axis is performed.

When the driving shaft 40 of the leveling actuator 38 is moved in the longitudinal direction by the drive force of the drive control portion 39, the lamp unit 7 and the joint 13 are pivoted relative to the bracket 16, with the pivoting shaft portions 15a, 15a serving as the fulcrum, so that a leveling adjustment of adjusting the direction of the optical axis, which changes depending on the weight of an object placed on the vehicle, is performed.

In the vehicular headlamp 1, if the leveling actuator 38 should fail, replacement of the leveling actuator 38 is performed as follows (see FIGS. 5 to 8).

Figure 5:
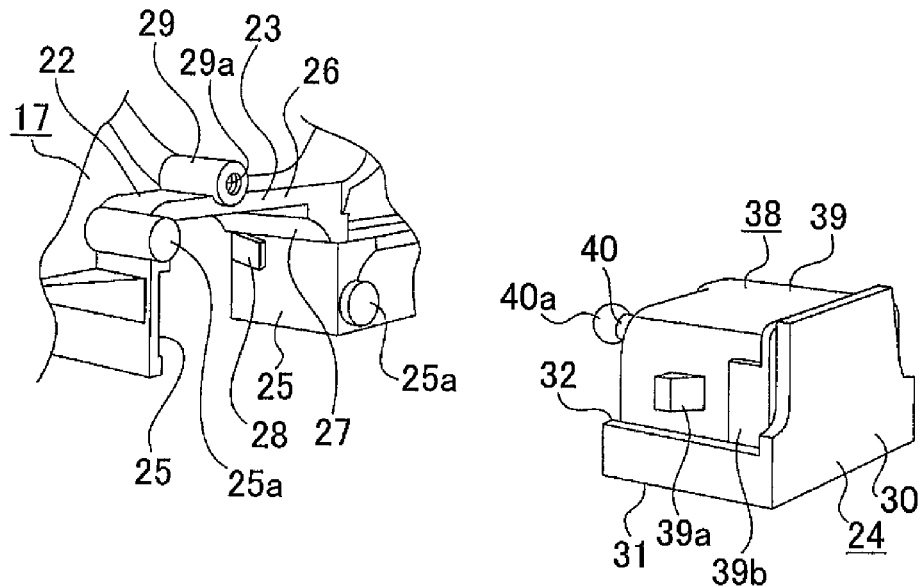
FIG. 5 is a perspective view showing a state in which a cuttable portion has been cut off and a leveling actuator and the cuttable portion have been detached rearward from a bracket, and showing a procedure of replacement operation for the leveling actuator together with FIGS. 6 to 9.
Figure 6:
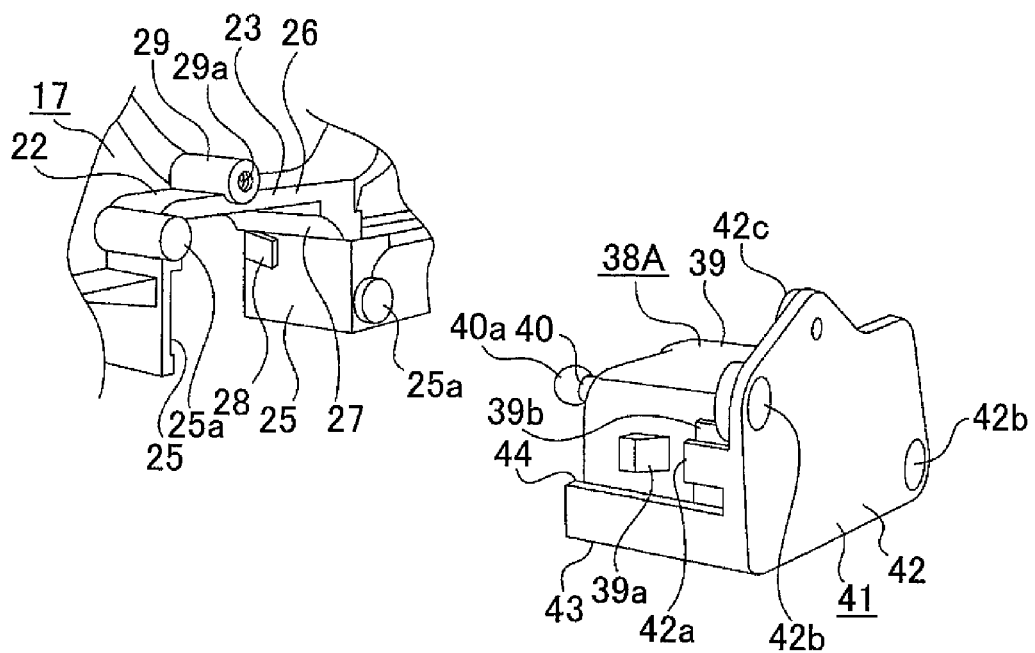
FIG. 6 is a perspective view showing a state in which a new leveling actuator attached to an actuator holder has been prepared.

Firstly, the back cover 6 is removed, and a tool, such as a cutter or the like, is inserted into the lamp chamber 5 through the attachment hole 2a, and the cuttable portion 24 is cut out by cutting the junction portions 24a, 24a and 24b of the cuttable portion 24 with the tool, and then the leveling actuator 38 is detached rearward from the bracket 16 (see FIG. 5).

At this time, since the junction portions 24a, 24a and 24b are thinner than the other portions of the bracket 16, the cutting of the junction portions 24a, 24a and 24b can easily be carried out in a short period of time, so that the ease of operation in replacing the leveling actuator 38 can be improved.

Furthermore, since the junction portions 24a, 24a and 24b are formed so as to be thinner than the other portions of the bracket 16, the cutting portions are clearly recognizable, and the cutting of the junction portions 24a, 24a and 24b can reliably be performed.

Furthermore, since the junction portions 24a, 24a and 24b are formed linearly, the cutting of the junction portions 24a, 24a and 24b can easily be carried out in an even shorter time, so that the ease of operation in replacing the leveling actuator 38 can be further improved.

Still further, as for the cuttable portion 24, the entire outer peripheral edge of the back surface portion 30 is not joined to other portions of the bracket 16. That is, only the junction portions 24a, 24a and 24b, which are portions of the outer peripheral edge other than the portions where the through holes 22a, 22a are formed, are joined to other portions of the bracket 16. Therefore, since the portions to be cut with the tool when the cuttable portion 24 is cut is reduced, the cutting of the cuttable portion 24 can be carried out in a short time, so that the ease of operation in replacing the leveling actuator 38 can be further improved.

When the cuttable portion 24 has been detached from the bracket 16, the leveling actuator 38, which is still retained on the cuttable portion 24, has been detached from the lamp unit 7, so that the fixation of the leveling actuator 38 to the actuator attaching portion 22 by the first fixation portions 28, 28 and the linkage of the driving shaft 40 to the shaft linkage portion 14 have been discontinued.

The cuttable portion 24 and the leveling actuator 38 are drawn out to the outside through the attachment hole 2a of the lamp housing 2.

Next, a new leveling actuator 38A is prepared. The leveling actuator 38A has the same structure as the leveling actuator 38, and is attached to an actuator holder 41 beforehand (see FIG. 6).

Figure 7:
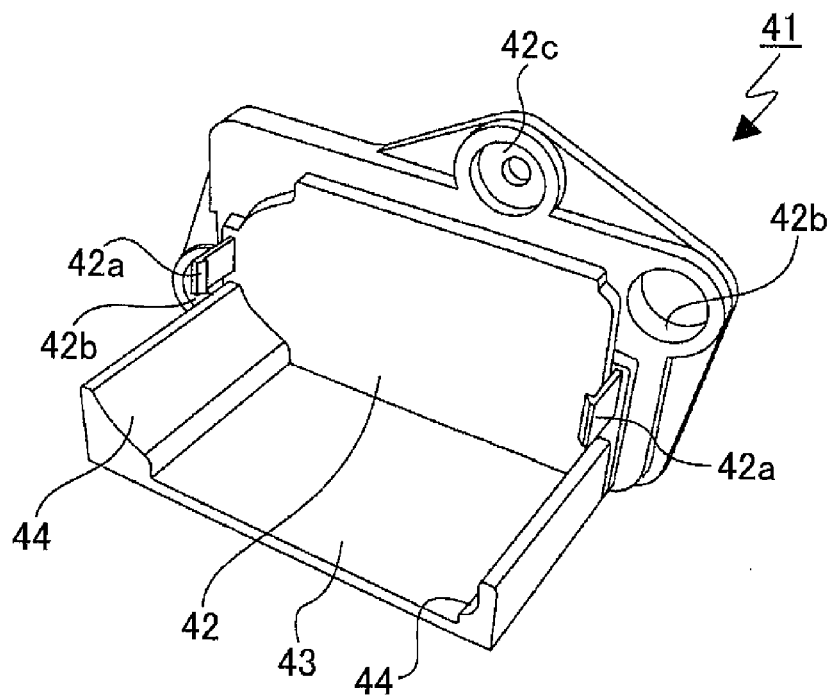
FIG. 7 is an enlarged perspective view of the actuator holder.
Figure 8:
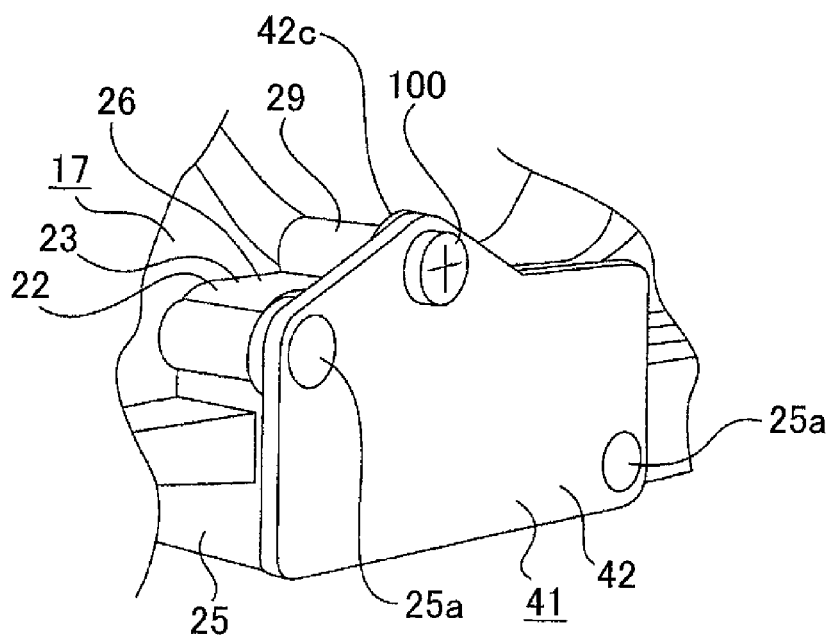
FIG. 8 is a perspective view showing a state in which the new leveling actuator has been attached to the bracket via the actuator holder.

As shown in FIG. 7, the actuator holder 41 is made up of a back surface portion 42 that faces in the longitudinal direction, a bottom surface portion 43 projected forward from a lower end portion of the back surface portion 42, and lower-side retention portions 44, 44 provided on left and right end portions of the bottom surface portion 43. Each of the lower-side retention portions 44, 44 has a portion that is inclined relative to the vertical direction and the horizontal direction.

Left and right end portions of the back surface portion 42 are provided with engagement protrusions 42a, 42a that are projected forward. The left and right end portions of the back surface portion 42 are provided with positioning holes 42b, 42b that extend therethrough in the longitudinal direction, and an upper end portion of the back surface portion 42 has a to-be-fixed portion 42c that has a screw insertion hole.

The engagement protrusions 42a, 42a are engaged with the engaging protrusions 39b, 39b of the drive control portion 39, so that the leveling actuator 38A is attached to the actuator holder 41. At this time, a rear surface and a lower surface of the drive control portion 39 of the leveling actuator 38A are held from rear and from below by the back surface portion 42 and the bottom surface portion 43, respectively, and two lower corner portions of the drive control portion 39 are respectively held from outside by the lower-side retention portions 44, 44. In this manner, the leveling actuator 38A is stably retained by the actuator holder 41.

Next, the actuator holder 41 in which the leveling actuator 38A is retained is inserted into the lamp chamber 5 through the attachment hole 2a of the lamp housing 2, and the leveling actuator 38A is inserted into the outer frame portion 23 from rear, and then the spherical linkage portion 40a of the leveling actuator 38A is linked to the joint 13 by inserting the linkage portion 40a into the linking recess portion 14a of the shaft linkage portion 14.

Subsequently, the positioning of the actuator holder 41 to the actuator attaching portion 22 is carried out by inserting the positioning bosses 25a, 25a provided on the actuator attaching portion 22 of the bracket 16 into the positioning holes 42b, 42b of the actuator holder 41. Then, the actuator holder 41 is fixed to the actuator attaching portion 22 by inserting an attachment screw 100 into the screw insertion hole of the to-be-fixed portion 42c and screwing the attachment screw 100 into the screw hole 29a of the second fixation portion 29 (see FIG. 8).

In this manner, the actuator holder 41 is fixed to the actuator attaching portion 22 by using the attachment screw 100. Finally, the back cover 6 is attached to the lamp housing 2. Thus, the operation of replacing the leveling actuator 38 with the leveling actuator 38A is finished.

Incidentally, although the cuttable portion 24 having a configuration in which the leveling actuator 38 is fixed by using the elastically deformable first fixation portions 28, 28 is shown above as an example, the cuttable portion is not limited to a structure in which the leveling actuator is fixed by using the elastically deformable first fixation portions 28, 28. For example, it is also permissible to adopt a cuttable portion 24A to which the leveling actuator 38 is fixed by screw fastening as described below (see FIG. 9).

The cuttable portion 24A includes a back surface portion 30A. The back surface portion 30A is provided with first fixation portions 30a, 30a that each have a screw hole and are projected forward. In the cuttable portion 24A, similar to the cuttable portion 24, lower end portions of left and right side edges of the back surface portion 30A and an upper edge of the back surface portion 30A are provided as first junction portions 24a, 24a and a second junction portion 24b, respectively.

In the case where the cuttable portion 24A is used, the leveling actuator 38 needs to be constructed so that screw fastening is possible. In that case, for example, the drive control portion 39 may be provided with a screw fastening portion that allows screw fastening, or a separate member that has a screw fastening portion may be attached to a rear surface of the drive control portion 39.

The leveling actuator 38 is fixed to the cuttable portion 24A as the screw fastening portions are screwed fast to the first fixation portions 30a, 30a.

By attaching the leveling actuator 38 to the actuator attaching portion 22A by fixing the leveling actuator 38 to the cuttable portion 24A through screw fastening as described above, it is possible to simplify the assembly operation of attaching the leveling actuator 38 to the actuator attaching portion 22A and to secure a state in which the leveling actuator 38 is stably retained by the actuator attaching portion 22A.

In the case where the cuttable portion 24A is used, the cuttable portion 24A is designed to have a structure that does not have a bottom surface portion, so that a corresponding size reduction of the lamp unit 7 can be achieved.

As described above, by taking out the cuttable portion 24 or 24A together with the leveling actuator 38 rearward and attaching a new leveling actuator 38A to the bracket 16 from rear via the actuator holder 41, the taking out or extraction of the leveling actuator 38 and the attaching of the leveling actuator 38A, etc., can be carried out through the use of the attachment hole 2a formed in the lamp housing 2. Therefore, the operation of replacing the leveling actuator 38 with the leveling actuator 38A can be smoothly carried out.

As for the vehicular headlamp 1, the extraction and attachment of the leveling actuators 38 and 38A and the like in the operation of replacing the leveling actuator 38 with the leveling actuator 38A can be carried out in the vertical direction as in modifications shown below (see FIGS. 10 to 15).

In the modifications shown below, the actuator attaching portion is different partially in structure from the above-described actuator attaching portion 22. Therefore, in the description of the actuator attaching portions in accordance with the modifications, only portions and the like that distinguish the modified actuator attaching portions from the actuator attaching portion 22 will be described, and the other portions will be assigned with the same reference characters as used for the same or comparable portions of the actuator attaching portion 22, and descriptions of those portions will be omitted.

Figure 10:
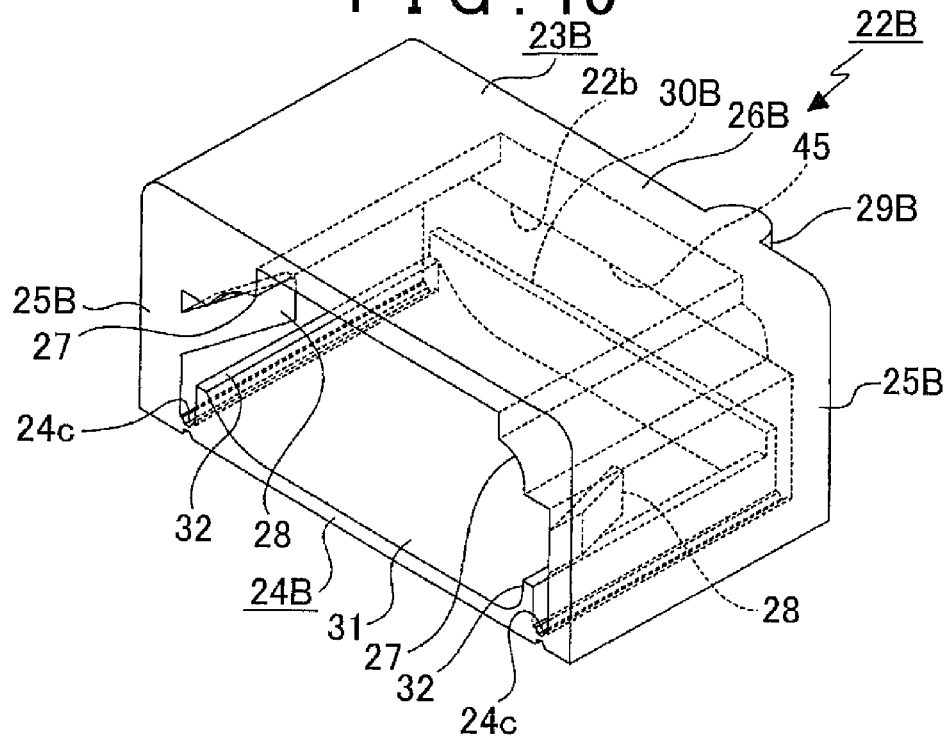
FIG. 10 is an enlarged perspective view of the actuator attaching portion, showing the case where an actuator attaching portion in accordance with a modification is used, together with FIGS. 11 to 15.
Figure 11:
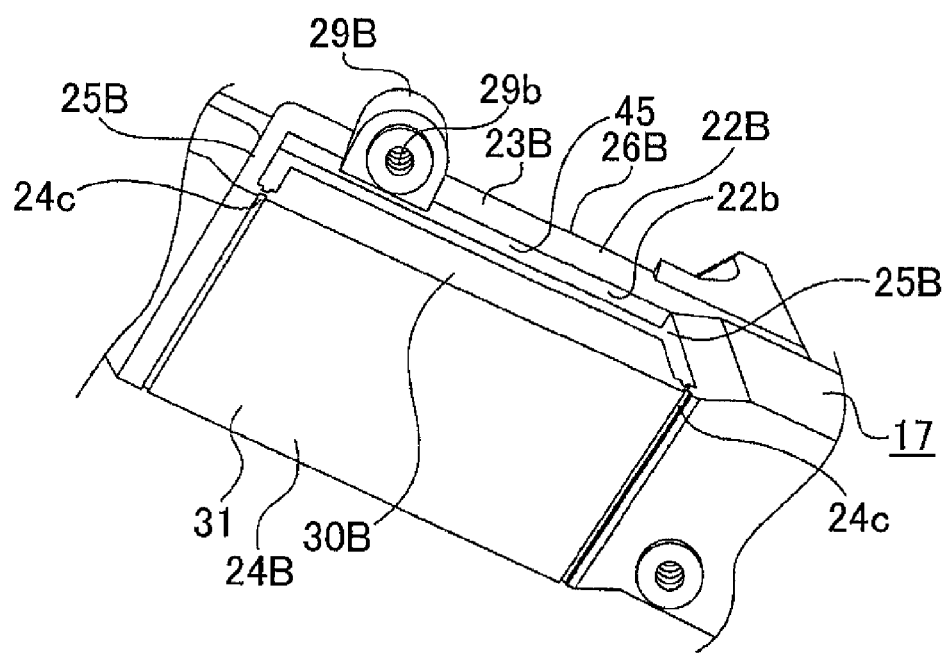
FIG. 11 is an enlarged perspective view showing a state in which the actuator attaching portion is viewed from a direction different from the direction from which the actuator attaching portion is viewed in FIG. 10.

In the case where the operation of replacing the leveling actuator 38 with the leveling actuator 38A is performed in the vertical direction, the bracket 16 is provided with an actuator attaching portion 22B (see FIGS. 10 and 11). The actuator attaching portion 22B has a construction in which the outer frame portion 23B and the cuttable portion 24B are integrally formed, and is formed in the shape of a box that is open forward.

The outer frame portion 23B has: generally plate-shaped side portions 25B, 25B that face in the left and right directions and that are positioned apart from each other in the left and right directions; a generally plate-shaped upper portion 26B that connects upper ends of the side portions 25B, 25B and that faces in the vertical direction; and a back surface portion 45 that connects continuously to upper end portions of the side portions 25B, 25B and to the upper portion 26B and that faces in the longitudinal direction. Upper end-side portions of the left and right side portions 25B and 25B and left and right end portions of the upper portion 26B are connected by left and right upper-side retention portions 27, 27, respectively.

Inner surfaces of the side portions 25B, 25B are provided with first fixation portions 28, 28.

Second fixation portions 29B, 29B are provided on a lower surface of one of the side portions 25B and a rear surface of the upper portion 26B, respectively. The second fixation portions 29B, 29B have screw holes 29b, 29b that are open downward.

A cuttable portion 24B includes a back surface portion 30B that faces in the longitudinal direction, a bottom surface portion 31 projected forward from a lower end portion of the back surface portion 30B, and lower-side retention portions 32, 32 provided on left and right end portions of the bottom surface portion 31.

In the cuttable portion 24B, left and right side edges of the bottom surface portion 31 are provided as junction portions 24c, 24c that are joined to the side portions 25B, 25B, respectively. The junction portions 24c, 24c are formed in a linear shape, and are thinner in wall thickness than the other portions of the bracket 16, that is, have a thin-walled configuration.

A portion of the actuator attaching portion 22B that is between the back surface portion 30B and the back surface portion 45 of the outer frame portion 23B is formed as a through hole 22b. The first fixation portions 28, 28 are provided to the front of the through hole 22b.

Thus, the actuator attaching portion 22B is constructed so that the first fixation portions 28, 28 are located to the front of the through hole 22b. Therefore, when the bracket 16 is produced by injection molding through the use of a molding die, the first fixation portions 28, 28 can easily be formed by aligning the direction of release of the molding die with the extending direction of the through hole 22b (the longitudinal direction).

The leveling actuator 38 is attached to the actuator attaching portion 22B of the bracket 16.

The leveling actuator 38 is attached to the actuator attaching portion 22B as the drive control portion 39 is inserted into the actuator attaching portion 22B from front and the drive control portion 39 is fixed to the first fixation portions 28, 28.

When the drive control portion 39 has been fixed by the first fixation portions 28, 28, the rear surface and the lower surface of the drive control portion 39 are held from rear and from below by the back surface portion 45 of the outer frame portion 23B and the back surface portion 30B of the cuttable portion 24B and by the bottom surface portion 31 of the cuttable portion 24B, respectively, and four corner portions of the drive control portion 39 are held from outside by the upper-side retention portions 27, 27 of the outer frame portion 23B and the lower-side retention portions 32, 32 of the cuttable portion 24B.

Therefore, the leveling actuator 38 is stably retained by the actuator attaching portion 22B in a state in which the leveling actuator 38 is positioned at a predetermined position on the actuator attaching portion 22B.

Furthermore, since the outer frame portion 23B of the actuator attaching portion 22B is provided with the back surface portion 45, the leveling actuator 38 is held from rear by the back surface portion 45, and the state of attachment of the leveling actuator 38 to the actuator attaching portion 22B can be made stable and the scratching or damaging of the leveling actuator 38 can be prevented.

Replacement of the leveling actuator 38 is performed as follows (see FIGS. 12 to 15).

Figure 12:
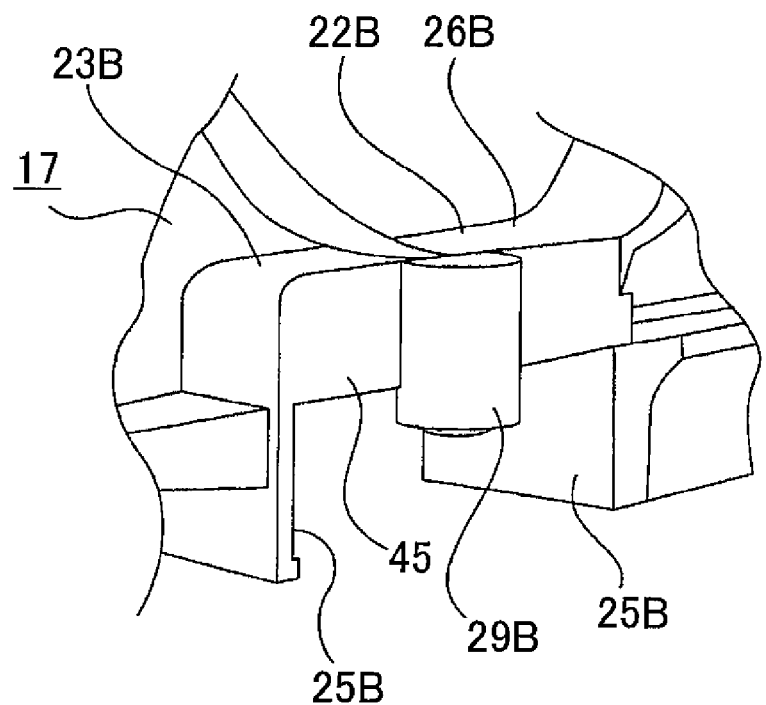
FIG. 12 is a perspective view showing a state in which a cuttable portion has been cut off and a leveling actuator and the cuttable portion have been detached downward from the bracket, and showing a procedure of replacement operation for the leveling actuator together with FIGS. 13 to 15.
Figure 12:
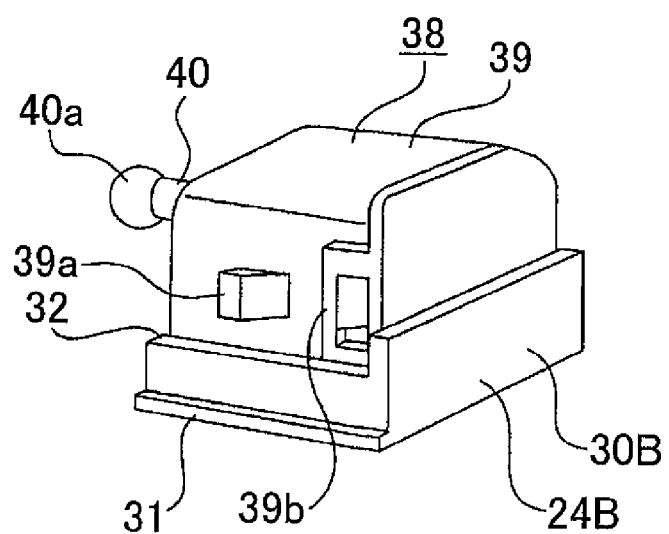
Figure 13:
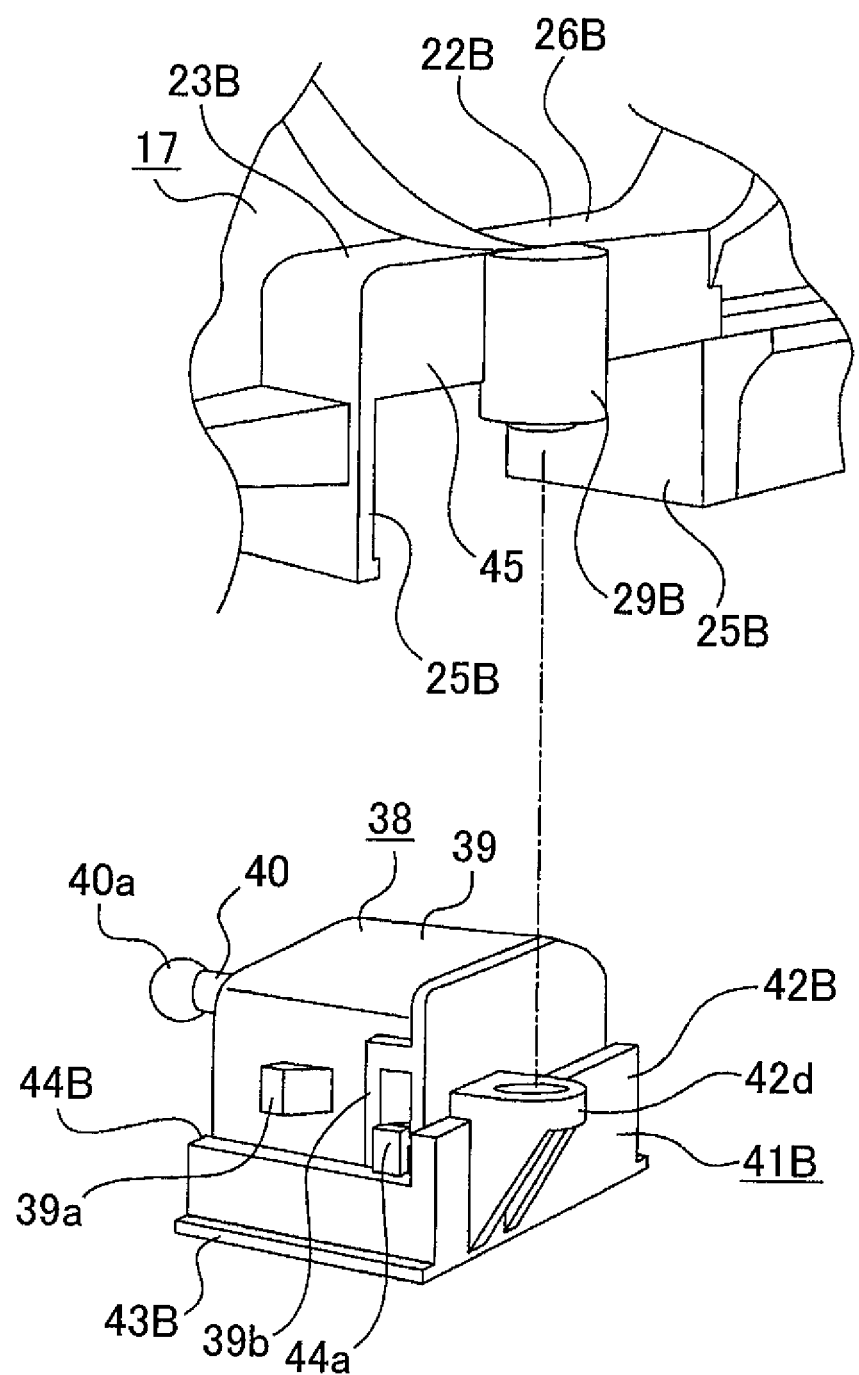
FIG. 13 is a perspective view showing a state in which a new leveling actuator attached to an actuator holder has been prepared.

Firstly, a tool, such as a cutter or the like, is inserted into the lamp chamber 5 from below, and the junction portions 24c, 24c of the cuttable portion 24B are cut with the tool, and the cuttable portion 24B is cut off and detached downward from the bracket 16 (see FIG. 12).

At this time, since the junction portions 24c, 24c are thinner in wall thickness than the other portions of the bracket 16, the cutting of the junction portions 24c, 24c can easily be carried out in a short time, so that the ease of operation in replacing the leveling actuator 38 can be improved.

Furthermore, since the junction portions 24c, 24c are linearly formed, the cutting of the junction portions 24c, 24c can be carried out easily in a further reduced time, so that the ease of operation in replacing the leveling actuator 38 can be further improved.

Furthermore, as for the cuttable portion 24B, the entire outer peripheral edge of the bottom surface portion 31 is not joined to other portions of the bracket 16. That is, only the junction portions 24d, which are left and right side edges of the bottom surface portion 31, are joined to other portions of the bracket 16. Therefore, since the portions to be cut with the tool when the cuttable portion 24B is cut is reduced, the cutting of the cuttable portion 24B can be carried out in a short time, so that the ease of operation in replacing the leveling actuator 38 can be further improved.

When the cuttable portion 24B has been detached from the bracket 16, the leveling actuator 38, which is still retained on the cuttable portion 24B, has been detached from the lamp unit 7, so that the fixation of the leveling actuator 38 to the actuator attaching portion 22B by the first fixation portions 28, 28 and the linkage of the driving shaft 40 to the shaft linkage portion 14 have been discontinued.

The cuttable portion 24B and the leveling actuator 38 are drawn out of the lamp housing 2 into the outside.

Next, a new leveling actuator 38A is prepared. The leveling actuator 38A is attached to an actuator holder 41 B beforehand (see FIG. 13).

Figure 14:
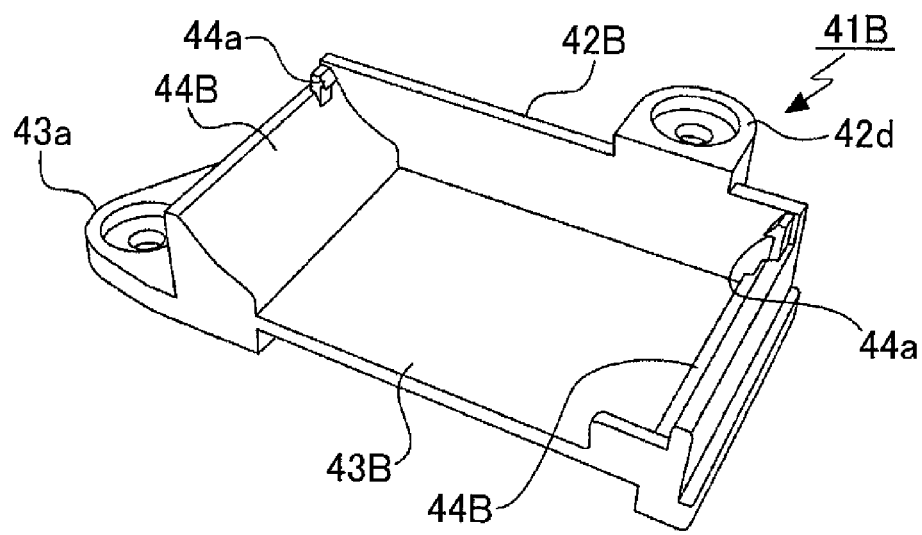
FIG. 14 is an enlarged perspective view of the actuator holder.

As shown in FIG. 14, the actuator holder 41B includes a back surface portion 42B that faces in the longitudinal direction, a bottom surface portion 43B projected forward from a lower end portion of the back surface portion 42B, and lower-side retention portions 44B, 44B provided on left and right end portions of the bottom surface portion 43B.

An upper end portion of the back surface portion 42B is provided with a to-be-fixed portion 42d that is projected rearward. The bottom surface portion 43B is provided with a to-be-fixed portion 43a that is projected sideways. Rear end portions of the lower-side retention portions 44B, 44B are provided with engagement protrusions 44a, 44a that are projected upward.

The leveling actuator 38A is attached to the actuator holder 41B as the engaging protrusions 39b, 39b of the drive control portion 39 are engaged with the engagement protrusions 44a, 44a, respectively. At this time, a rear surface and a lower surface of the drive control portion 39 of the leveling actuator 38A are held from rear and from below by the back surface portion 42B and the bottom surface portion 43B, respectively, and two lower corner portions of the drive control portion 39 are respectively held stably from outside by the lower-side retention portions 44B, 44B. In this manner, the leveling actuator 38A is stably held by the actuator holder 41B.

Next, the actuator holder 41B in which the leveling actuator 38A is retained is inserted into the lamp chamber 5, and the leveling actuator 38A is inserted into the outer frame portion 23B from below, and then the spherical linkage portion 40a of the leveling actuator 38A is linked to the joint 13 by inserting the linkage portion 40a to the linking recess portion 14a of the shaft linkage portion 14.

Figure 15:
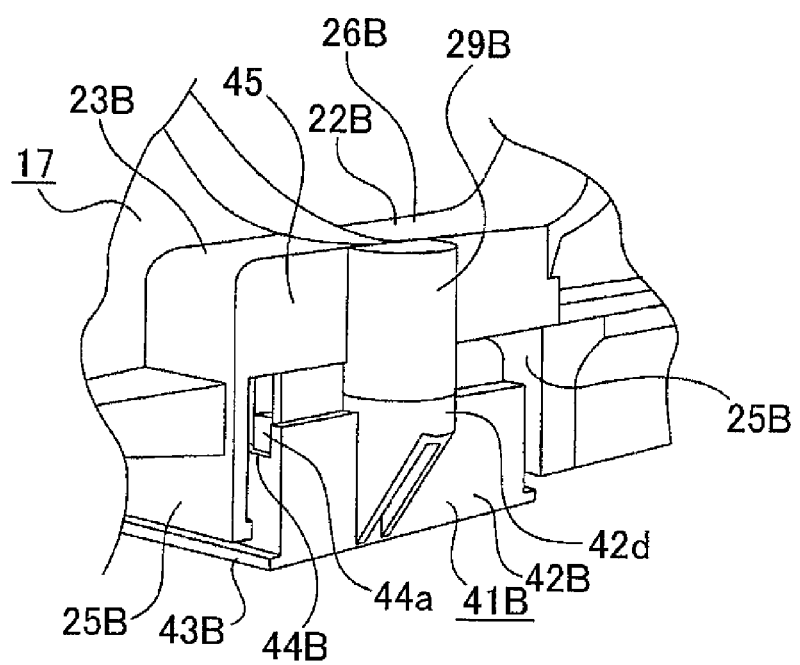
FIG. 15 is a perspective view showing a state in which the new leveling actuator has been attached to the bracket via the actuator holder.

Subsequently, attachment screws 100, 100 are inserted into screw insertion holes of the to-be-fixed portions 42d and 43a, and are screwed into the screw holes 29b, 29b of the second fixation portions 29B, 29B to fix the actuator holder 41B to the actuator attaching portion 22B (see FIG. 15).

In this manner, the actuator holder 41B is fixed to the actuator attaching portion 22B by using the attachment screws 100, 100, so that the operation of replacing the leveling actuator 38 with the leveling actuator 38A is finished.

Figure 9:
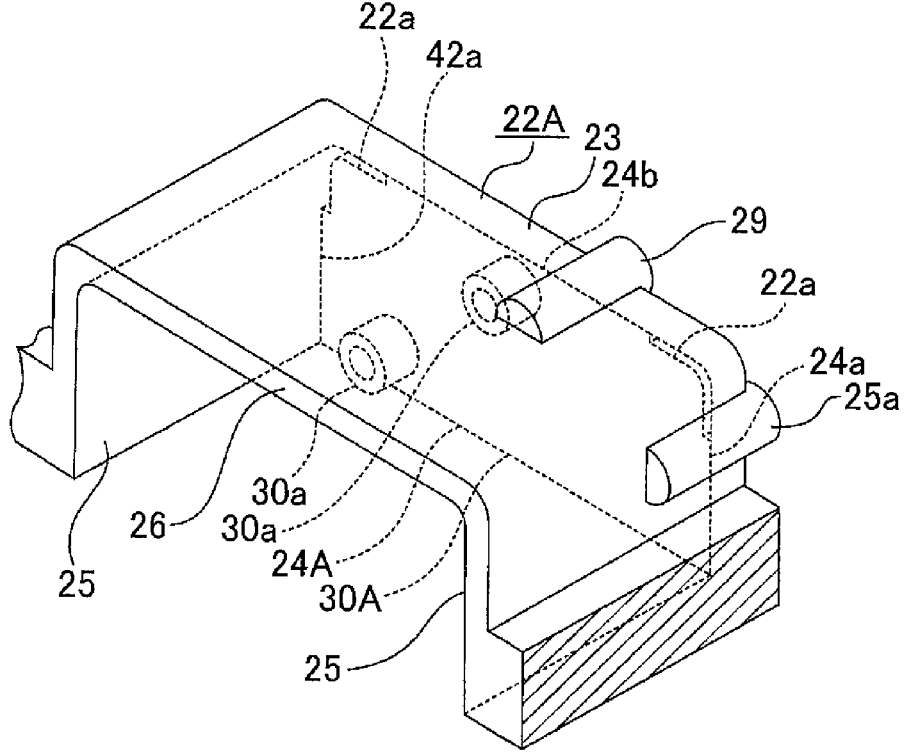
FIG. 9 is an enlarged perspective view showing the actuator attaching portion in the case where the leveling actuator is fixed by screw fastening.

Incidentally, although the cuttable portion 24B having a configuration in which the leveling actuator 38 is fixed by using the elastically deformable first fixation portions 28, 28 is shown above as an example, it is also permissible to adopt a cuttable portion to which the leveling actuator 38 is fixed by screw fastening, similar to the cuttable portion 24 (see FIG. 9).

As described above, in the case where the cuttable portion 24B is taken out downward together with the leveling actuator 38, and the new leveling actuator 38A is attached to the bracket 16 from below via the actuator holder 41B, it is preferable that, for example, the lamp housing 2 be provided with an opening for attaching a discharge lamp lighting device and the like.

As described above, in the vehicular headlamp 1, the leveling actuator 38 is attached to the actuator attaching portion 22, 22A or 22B from one direction and is fixed via the first fixation portions 28, 28 or 30a, 30a, and after the cuttable portion 24, 24A or 24B is cut off and the leveling actuator 38 is taken out of the bracket 16 in another direction that is different from the aforementioned one direction, another leveling actuator 38A is attached to the actuator attaching portion 22, 22A or 22B by fixing the leveling actuator 38A to the second fixation portion 29 or 29B, 29B.

Therefore, since the leveling actuator 38 or 38A is attached to the bracket 16 and is disposed within the outer lamp casing 4, it is possible to improve the ease of maintenance regarding the leveling actuator 38 while achieving a size reduction.

Furthermore, the leveling actuator 38A is attached to the actuator attaching portion 22, 22A or 22B as the to-be-fixed portion 42c or the to-be-fixed portions 42d and 43a provided on the actuator holder 41 or 41B are fixed to the second fixation portion 29 or the second fixation portions 29B, 29B.

Therefore, the replacement of the leveling actuator 38 with the leveling actuator 38A can be carried out by a simple operation using a minimum arrangement of component parts.

A portion of an outer peripheral edge of the cuttable portion may be a junction portion joined to other part of the bracket that is other than the cuttable portion, and the thickness of the junction portion may be less than the thickness of the other part of the bracket.

With this configuration, the cutting of the junction portion can easily be carried out in a short time, so that the ease of operation in replacing the leveling actuator can be improved.

The junction portion may be generally straight.

With this configuration, the cutting of the junction portion can be carried out easily in a further reduced time, so that the ease of operation in replacing the leveling actuator can be further improved.

A through hole that extends in the longitudinal direction of the headlamp and is adjacent to the junction portion may be formed between the cuttable portion and the other part of the bracket, and the first fixation portion may be provided to the front of the through hole.

With this configuration, since the portions to be cut with the tool when the cuttable portion is cut is reduced, the cutting of the cuttable portion can be carried out in a short time, so that the ease of operation in replacing the leveling actuator can be further improved.

The configurations and structures of the various portions shown above in conjunction with the above-described embodiments for carrying out the invention are mere examples of embodiments accomplished in carrying out the invention, and the technical scope of the invention should not be construed as being limited to these examples.

What is claimed is:

1. A vehicular headlamp comprising:
an outer lamp casing that includes a lamp housing and a cover, the lamp housing having an opening, the cover closing the opening of the lamp housing;
a bracket including an actuator attaching portion that has a first fixation portion and a second fixation portion and part of which is a cuttable portion, the bracket being supported, within the outer lamp casing, by the lamp housing so as to be tiltable in a predetermined direction via an aiming adjustment mechanism;
a first leveling actuator that is attached, within the outer lamp casing, to the actuator attaching portion from one direction and is fixed via the first fixation portion; and
a lamp unit that is supported, within the outer lamp casing, by the bracket so as to be tiltable in a predetermined direction, and to which the first leveling actuator is linked, the lamp unit being capable of being tilted relative to the bracket by drive force of the first leveling actuator, wherein
the actuator attaching portion is configured so that the cuttable portion can be cut off to detach the first leveling actuator from the bracket in another direction than the one direction and a second leveling actuator can be attached to the actuator attaching portion from the another direction and fixed to the actuator attaching portion via the second fixture portion, wherein:
the first fixation portion is formed in a plate shape so as to be elastically deformed, and a proximal end portion of the first fixation portion is continuous to an inner surface of a side portion of the actuator attaching portion, and the first fixation portion is inclined so as to become apart from the inner surface with increase in distance from the base end portion in a direction of distal end portion of the first fixation portion, the distal end being located to a direction of the base end portion that is a direction in which the first leveling actuator is moved when the first actuator is attached from the one direction;
a side surface of the first leveling actuator has a fixing protrusion; and
the first leveling actuator is fixed to the actuator attaching portion by the first fixation portion being engaged with a tip of the fixing protrusion.

2. The vehicular headlamp according to claim 1, wherein the second fixation portion includes a screw hole facing in the another direction.

3. The vehicular headlamp according to claim 1, wherein:
a portion of an outer peripheral edge of the cuttable portion is a junction portion joined to another part of the bracket that is other than the cuttable portion; and
a thickness of the junction portion is less than a thickness of the other part of the bracket.

4. The vehicular headlamp according to claim 3, wherein the junction portion is straight.

5. The vehicular headlamp according to claim 3, wherein:
a through hole that is adjacent to the junction portion and that extends in a longitudinal direction of the headlamp is formed between the cuttable portion and the other part of the bracket; and
the first fixation portion is provided in front of the through hole.

6. The vehicular headlamp according to claim 1, wherein:
the actuator attaching portion has a through hole in a wall portion that is adjacent to the side portion to which the first fixation portion is continuous; and
the through hole extends at least throughout a region of a projection of the first fixation portion on an imaginary plane that includes the wall portion.

7. The vehicular headlamp according to claim 1, wherein the first fixation portion includes a screw hole that is formed in the cuttable portion.

8. A vehicular headlamp comprising:
an outer lamp casing that includes a lamp housing and a cover, the lamp housing having an opening, the cover closing the opening of the lamp housing;
a bracket including an actuator attaching portion that has a first fixation portion and a second fixation portion and part of which is a cuttable portion, the bracket being supported, within the outer lamp casing, by the lamp housing so as to be tiltable in a predetermined direction via an aiming adjustment mechanism;
a first leveling actuator that is attached, within the outer lamp casing, to the actuator attaching portion from one direction and is fixed via the first fixation portion; and
a lamp unit that is supported, within the outer lamp casing, by the bracket so as to be tiltable in a predetermined direction, and to which the first leveling actuator is linked, the lamp unit being capable of being tilted relative to the bracket by drive force of the first leveling actuator, wherein the actuator attaching portion is configured so that the cuttable portion can be cut off to detach the first leveling actuator from the bracket in another direction than the one direction and a second leveling actuator can be attached to the actuator attaching portion from the another direction and fixed to the actuator attaching portion via the second fixture portion, wherein:

the cuttable portion has a back surface portion that faces in a longitudinal direction of the headlamp, a bottom surface portion that is projected forward from a lower end portion of the back surface portion, and lower-side retention portions that are provided on left and right end portions of the bottom surface portion; and the lower-side retention portion has a portion that is inclined relative to a vertical direction and a horizontal direction of the headlamp.

9. The vehicular headlamp according to claim 8, wherein:
each of portions of the cuttable portion that are lower-side portions of left and right side edges of the back surface portion that faces in the longitudinal direction of the headlamp is a first junction portion that is joined to a side portion of the actuator attaching portion;
an upper edge of the back surface portion of the cuttable portion is a second junction portion that is joined to an upper portion of the actuator attaching portion; and
the first junction portions and the second junction portion are thinner than the other part of the bracket.

10. The vehicular headlamp according to claim 9, wherein
the first junction portions and the second junction portion are generally straight.

11. The vehicular headlamp according to claim 9, wherein
the one direction is a front direction of the headlamp and the another direction is a rear direction of the headlamp.

12. The vehicular headlamp according to claim 8, wherein
each of left and right side edges of the bottom surface portion of the cuttable portion is a junction portion that is joined to a side portion of the actuator attaching portion.

13. The vehicular headlamp according to claim 12, wherein
the one direction is a front direction of the headlamp and the another direction is a downward direction of the headlamp.

14. The vehicular headlamp according to claim 12, wherein
the junction portion is generally straight.

15. A replacement method for a leveling actuator of a vehicular headlamp, comprising:
attaching a first leveling actuator, from one direction, to an actuator attaching portion that is provided, within an outer lamp casing, on a bracket supported so as to be tiltable in a predetermined direction and part of which is a cuttable portion, and fixing the first leveling actuator via a first fixation portion that is provided on the actuator attaching portion;
cutting off the cuttable portion and detaching the first leveling actuator from the bracket in another direction than the one direction; and
attaching a second leveling actuator to the actuator attaching portion from the another direction, and fixing the second leveling actuator via a second fixation portion that is provided on the actuator attaching portion.

* * * * *